United States Patent [19]

Van Zanten et al.

[11] Patent Number: 4,823,337
[45] Date of Patent: Apr. 18, 1989

[54] DEVICE FOR RECORDING INFORMATION ON OR READING INFORMATION FROM AN INFORMATION DISC

[75] Inventors: Pieter Van Zanten; Evert-Jan Mulder, both of Eindhoven, Netherlands

[73] Assignee: U.S. Philips Corp., New York, N.Y.

[21] Appl. No.: 99,268

[22] Filed: Sep. 21, 1987

[30] Foreign Application Priority Data

Apr. 8, 1987 [NL] Netherlands ................... 8700819

[51] Int. Cl.⁴ ............... G11B 17/02; G11B 25/04; G01D 15/32
[52] U.S. Cl. .................... 369/270; 360/86; 360/99.12
[58] Field of Search .............. 369/270, 75.2, 77.2; 360/86, 97, 99

[56] References Cited

U.S. PATENT DOCUMENTS 4,232,870 11/1980 Iemenschot .................... 369/270
4,509,157 4/1985 Morinaga ..................... 369/75.2

FOREIGN PATENT DOCUMENTS 53-149011 12/1978 Japan .................. 369/270

Primary Examiner—Steven L. Stephan
Attorney, Agent, or Firm—F. Brice Faller

[57] ABSTRACT

Clamping device (21) for clamping an optical disc on a turntable comprises a disc-pressure means (23), a support (5) for the disc-pressure means, which support is movable between an operating position and a rest position, and a permanent-magnet system comprising a first axially magnetized annular magnet (31) and a second axially magnetized magnet (29) secured to the support and to the disc-operating means respectively. In the operating position of the support the disc-pressure means is pressed against the disc on the turntable by magnetic force and the disc-pressure means is freely rotatable relative to the support. The permanent magnets are positioned coaxially relative to each other, a radial air gap (33) being formed between the first magnet (31) and the second magnet (29) in the operating position of the support.

5 Claims, 3 Drawing Sheets

DEVICE FOR RECORDING INFORMATION ON OR READING INFORMATION FROM AN INFORMATION DISC

BACKGROUND OF THE INVENTION

The invention relates to a device for recording information on or reading information from a rotating information disc, in particular an optical disc, comprising a turntable which is rotatable about an axis of rotation and which has a supporting surface for the information disc, and a clamping device for clamping the information disc on the turntable. The clamping device comprises a disc-pressure means, a support for the disc-pressure means, which support is movable between an operating position and a rest position, and a permanent-magnet system comprising a first axially magnetized annular magnet and a second axially magnetized magnet which cooperates with said first magnet. On of the magnets is secured to the support and the other is secured to the disc-pressure means; the magnet system presses the disc-pressure means magnetically against the information disc on the turntable in the operating position of the support, in which position the disc-pressure means is freely rotatable relative to the support. As the support moves from its operating position to its rest position, it cooperates with the disc-pressure means to move the disc-pressure means away from the information disc and thus release the information disc, the support carrying the disc-pressure means in its rest position.

Such a device is known from Netherlands Patent Application No. 8202163, to which U.S. Pat. No. 4,768,185 corresponds, herewith incorporated by reference. The known device is intended for use in a videodisc player having a cover which when in its closed position can be swung open to place a video disc on or remove it from the turntable. The cover then functions as a support for the disc-pressure means and is provided with one of the magnets of the permanent-magnet system. The magnet system comprises two annular permanent magnets which are axially disposed one about the other and concentrically around a central portion of the disc-pressure means. The magnets are axially magnetized and arranged one above the other in such a way that their pole faces of like polarity face each other, an axial air gap being formed between the facing pole faces. Between the support and the disc-pressure means a magnetic force is exerted, pressing the disc-pressure means against a cover portion in the rest position of the support. In the operating position of the support the cover has moved so far that the disc-pressure means, which is clear of the cover, presses against a video disc on the turntable, the axial air gap between the magnets then being smaller than in the rest position of the support.

The clamping device of the known video-disc player has the disadvantage that the superposed repelling permanent magnets occupy an unstable radial position relative to one another. As a result of this, even small radial displacements of the magnets relative to one another, for example caused by vibrations of the optical-disc player, may give rise to radially directed shear forces between the support and the disc-pressure means. In the operating position of the support this may lead to structural parts, such as the bearing means of the turntable, being loaded additionally and it may give rise to the tracking movements of the scanning element of the player being impaired. A further consequence of the unstable position of the magnets relative to one another is that the disc-pressure means must have a central bore in which a free end portion of the drive spindle of the turntable is engageable during the movement of the support from its rest position to its operating position to pre-center the disc-pressure means relative to the turntable.

SUMMARY OF THE INVENTION

In the operating position of the support not only a complete mechanical isolation between the support and the disc-pressure means is obtained but also that a considerable degree of magnetic isolation can be obtained between the parts in a radial direction.

To this end the permanent magnets of the magnet system are positioned coaxially relative to one another, a radial air gap being formed between the first magnet and the second magnet at least in the operating position of the support. The coaxial arrangement of the permanent magnets enables the magnets to be axially positioned relative to one another in such a way that the radial stiffness of the support and the disc-pressure means is low. This radial stiffness is a measure of the degree of magnetic coupling between the magnets in a radial direction. Therefore, the position of the magnets relative to one another becomes more stable and the construction becomes less susceptible to radial displacements of the magnet relative to one another as the stiffness decreases.

For the radial stiffness to be minimized in the operating position the radial air gap between the first and second permanent magnet should have an axial length corresponding to the maximum value of the resulting magnetic force in the magnetic force/axial length diagram of the magnet system.

The relationship between the minimal radial stiffness and the maximum magnetic force of the permanent magnet system has been found by experiment. In this context it is theoretically possible to infer that the maximum magnetic force experienced by an elementary dipole which is disposed in the magnetic field of and in the direction of and on the axis of a rotationally symmetrical permanent-magnet system corresponds to zero radial stiffness.

Another embodiment is characterized in that the first permanent magnet is cylindrical. In this embodiment the magnet system can be manufactured very simply and economically. A very simple, yet very satisfactorily operating embodiment is characterized in that at its side which faces the turntable the disc-pressure means has a conical wall portion which is movable through an opening in the support, which wall portion as the support moves towards its operating position cooperates with a peripheral portion of the support which bounds the opening, to pre-center the disc-pressure means relative to the turntable, and which is spaced from the peripheral portion in the operating position.

It is to be noted that U.S. Pat. Nos. 4,509,157 and the 4,768,185 disclose an optical-disc player having a cover which can be swung open to place an optical disc on or remove it from the turntable. The clamping device for clamping the optical disc on the turntable of this player also comprises a support which is movable between a rest position and an operating position, and a disc-pressure means. However, the force with which the disc-pressure means is pressed against the disc on the turntable is furnished by an electromagnetic system comprising an electric coil secured to the support and a magnet secured to the disc-pressure means. In the closed position of the cover an electromagnetic force is exerted on the disc-pressure means by energizing the coil, which force causes the disc-pressure means to move towards or away from the disc on the turntable depending on the direction of the current in the coil. Except for the presence of a disc-pressure means and a support for the disc-pressure means this known device bears little resemblance to the device in accordance with the invention.

DETAILED DESCRIPTION OF THE PREFERRED EMBODIMENTS

Figure 1:
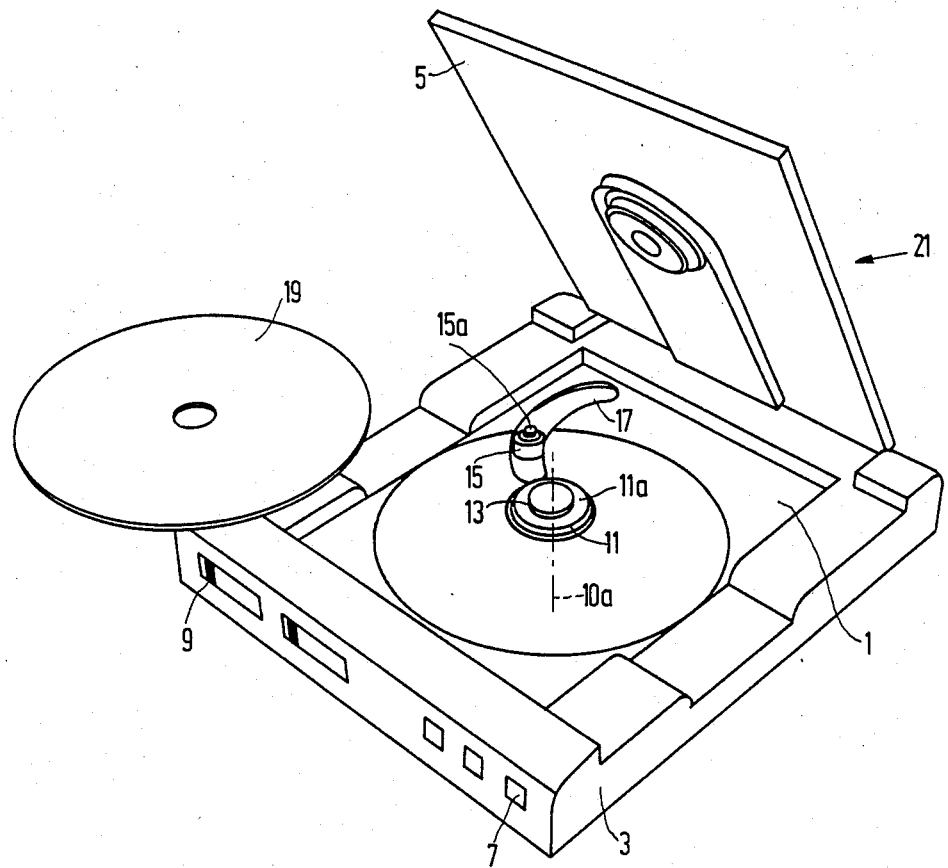
FIG. 1 is a perspective view of a Compact Disc player having a pivotable cover and provided with an embodiment of the device in accordance with the invention.

The optical-disc player shown in FIG. 1 comprises a frame 1, around which a housing 3 is mounted, and a support 5 in the form of a pivotable cover. At its front the housing 3 has a number of keys 7 and slides 9 for controlling the various functions of the disc player. The frame 1 carries an electric-motor unit 10 (see FIGS. 2 and 3) for supporting a turntable 11 and rotating this turntable about an axis of rotation 10a, which turntable has a supporting surface 11a and a centering mandril 13. The frame 1 further carries a focussing device 15 having an objective 15a at its upper side. By means of a drive mechanism, not shown, the focussing device 15 is movable relative to the turntable 11 along a rotary path such that the objective 15A follows a slot 17 in the frame 1. In addition to the objective 15a the focussing device 15 includes a laser unit, not shown, which during operation emits a sharply bounded radiation beam which is directed towards an optical disc 19 which is then situated on the supporting surface 11a of the turntable 11. The disc 19 is an information carrier for audio and video signals and has the property of reflecting and modulating the beam emitted by the focussing device 15. In the device the reflected beam is received by suitable opto-electronic means and is converted into signals which are transferred to other parts of the disc player. Since the construction and operation of the focussing device 15 and the said opto-electronic means are irrelevant to the invention these are not described. In this respect reference is made to U.S. Pat. No. 4,561,081, hereby incorporated by reference, which discloses an opto-electronic device suitable for use in the device in accordance with the invention.

The support 5, which is pivotally connected to the housing 3 by means of hinges, forms part of a clamping device 21 for clamping the disc 19 on the turntable 11.

Figure 2:
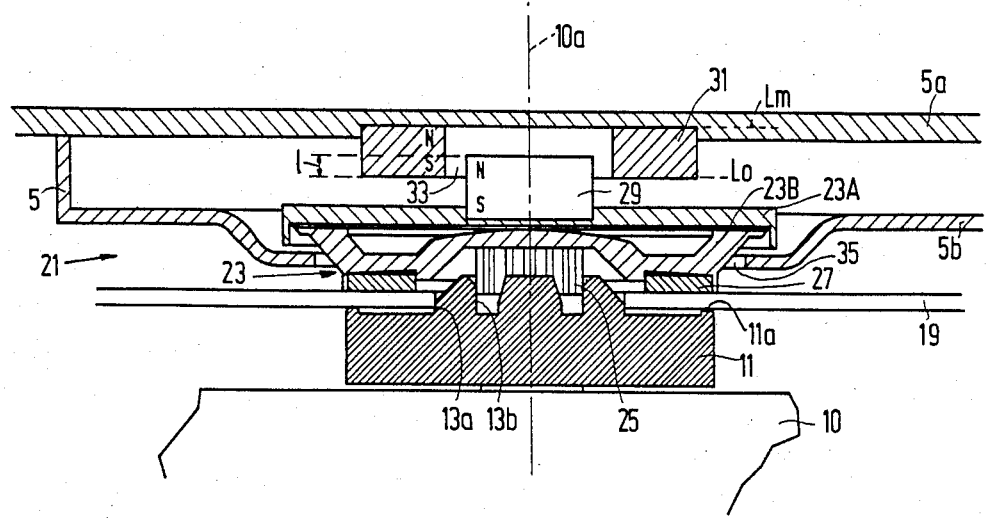
FIG. 2 is a partly sectional view across the axis of rotation of the player shown in FIG. 1 when the cover is closed.
Figure 3:
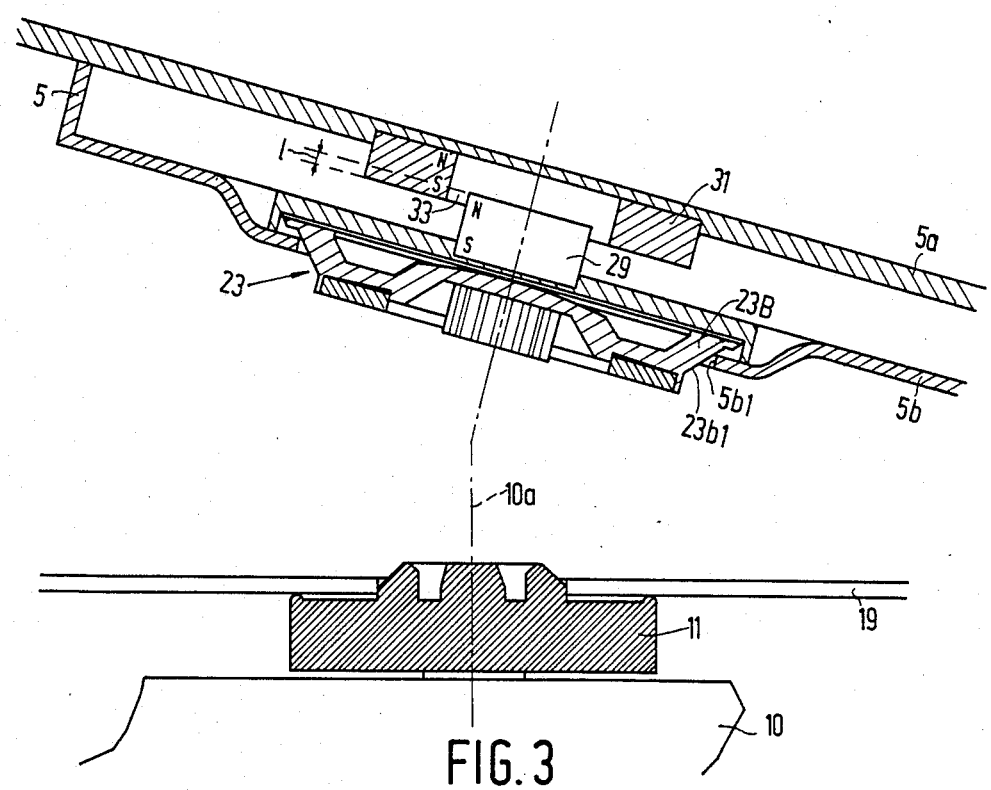
FIG. 3 is a partly sectional view across the axis of rotation of the player of FIG. 1 when the cover is open.

The clamping device 21 will be described in detail with reference to FIGS. 2 and 3.

The clamping device 21 comprises the said support 5 and a disc-pressure member 23. The support 5 is movable between an operating position, shown in FIG. 2, and a rest position, shown in FIG. 3. The disc-pressure member 23, which comprises an aluminum plate-shaped part 23A to which a plastic conical part 23B is glued, presses the disc 19 against the supporting surface 11a of the turntable 11 in the operating position of the support 5. An external centering surface 13a of the centering mandril 13 then ensures that the disc 19 is and remains positioned correctly relative to the axis of rotation 10a. The disc-pressure member 23 can also be positioned relative to the axis of rotation 10a by means of centering projections 25 which are integral with the conical portion 23B and which are adapted to cooperate with an internal centering surface 13b of the centering mandril 13. At its side which faces the disc 19 the disc-pressure means 23 has a rubber ring 27 which contacts disc 19.

The force with which the disc-pressure member 23 is pressed against the optical disc 19, which is disposed on the turntable 11 in the operating position of the support 5, is provided by a permanent-magnet system including an annular axially magnetized magnet 31 arranged coaxially around the a cylindrical magnetized central magnet 29. The magnets 29 and 31, which are magnetized in the same axial direction, are secured to the disc-pressure means 23 and to the support 5 respectively. Between the two magnets 29 and 31 an air gap 33 having an axial length L is formed.

Figure 4:
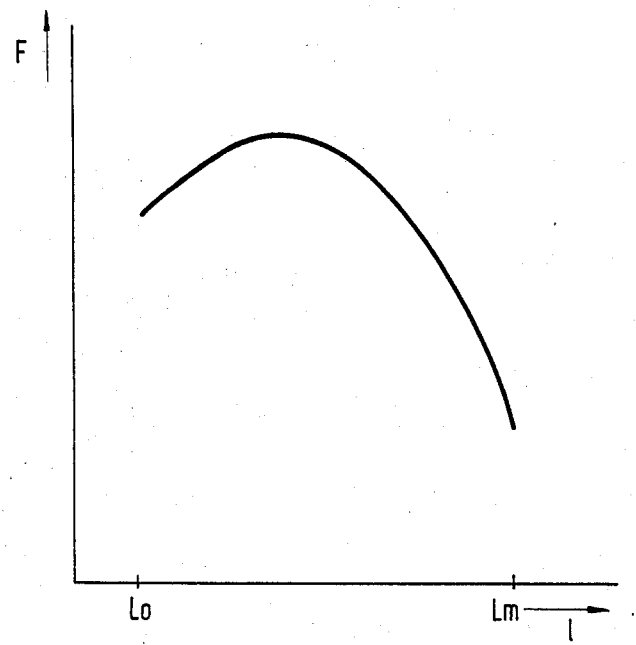
FIG. 4 is a schematic diagram illustrating the relationship between the magnetic force of the magnet system of the device and the axial length of the air gap in the magnet system.

The support 5 includes an upper plate 52 and a lower plate 56 formed with a central opening 35 through which the disc-pressure member 23 extends. This construction is dimensioned in such a way that in the operating position of the support 5 the disc-pressure member 23 is not in contact with the support 5 and can thus rotate freely with the rotating turntable 11. In the operating condition the magnets 29 and 31 suitably occupy such axial positions relative to each other that they exert a maximum repelling magnetic force on each other. In this respect reference is made to the diagram of FIG. 4, which illustrates the relationship between the magnetic force F and the length L of the radial air gap 33 when this length is varied between Lo and Lm (see also FIG. 2).

If the turntable 11 does not rotate and the support 5 is pivoted from its operating position to its rest position shown in FIG. 3, the disc-pressure member 23 is first pressed against the lower plate 5b by magnetic force and is subsequently lifted off the disc 19 by the lower plate 5b. In its rest position the disc-pressure member 23 occupies a precentered position in the support 5 as a result of the cooperation between the conical wall portion 23b1 of the part 23b and the peripheral portion 5b1 of the lower plate 5b, and the optical disc 19 can be removed from the turntable 11 and may be replaced by another optical disc. Since the axial length L of the air gap 33 in the rest position is smaller than in the operating position, as can be seen in the diagram, the repelling magnetic force between the magnets 29 and 31 in the rest position is smaller than in the operating position.

Figure 5:
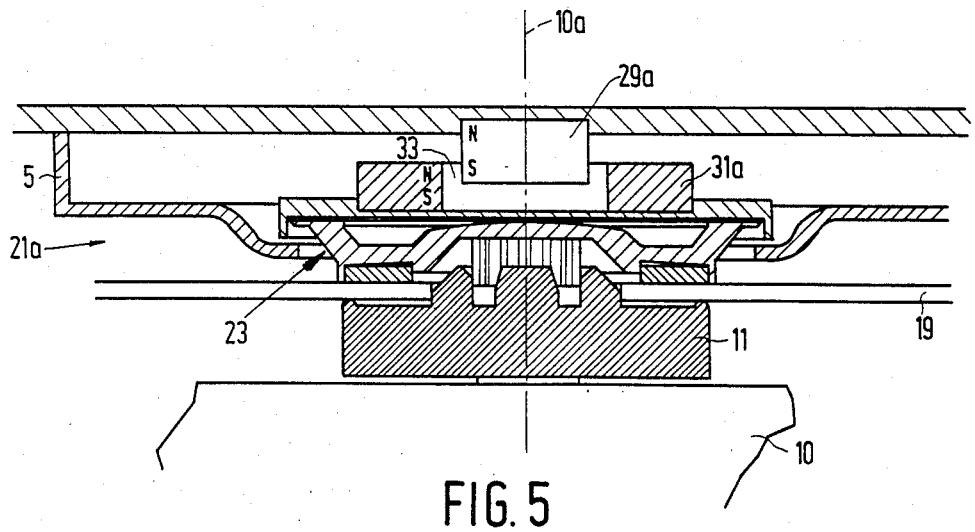
FIG. 5 is a partly sectional view across the axis of rotation of an optical-disc player provided with another embodiment of the device in accordance with the invention.

FIG. 5 shows an embodiment of the device which largely corresponds to the embodiment described in the foregoing, but which has a different magnet system. For the sake of clarity parts corresponding to parts of the embodiment shown in FIG. 2 bear the same reference numerals as in FIG. 2. The embodiment includes a turntable 11, which can be rotated about an axis of rotation 10a by an electric-motor unit 10, and a clamping device 21a for clamping an information disc 19 on the turntable 11. The clamping device 21a comprises a disc-pressure member 23, a support 5 for the disc-pressure member 23, which support is movable between an operating position, as shown, and a rest position, and a permanent-magnet system. The magnet system includes a first axially magnetized annular magnet 31a, which is glued to the disc-pressure member 23, and a second axially magnetized central magnet 29a, which is glued to the support. In the operating position the magnetic axis of the central magnet 29a coincides with the axis of rotation 10a, a radial air gap 33 being formed between this central magnet and the annular magnet 31a.

The operation and characteristics of the device shown in FIG. 5 further correspond to those of the device described with reference to FIGS. 2 and 3.

Obviously, the invention is not limited to the embodiments shown herein. For example, the support may be translated instead of pivoted between its operating position and its rest position.

What is claimed is:

1. A device for recording information on or reading information from a rotating information disc, in particular an optical disc, comprising a turntable which is rotatable about an axis of rotation and which has a supporting surface for the information disc, and a clamping device for clamping the information disc on the turntable, which clamping device comprises a disc-pressure means, a support for the disc-pressure means, which support is movable between an operating position and a rest position, and a permanent magnet system comprising a first axially magnetized annular magnet ad a second axially magnetized magnet which cooperates with said first magnet, one of said magnets being secured to the support and the other being secured to the disc-pressure means, which magnet system presses the disc-pressure means magnetically against the information disc on the turntable in the operating position of the support, in which position the disc-pressure means is freely rotatable relative to the support, which support as it moves from its operating position to its rest position, cooperates with the disc-pressure means to move the disc-pressure means away from the information disc and thus release the information disc, the support carrying the disc-pressure means in its rest position, characterized in that said permanent magnets are positioned coaxially relative to each other, a radial air gap being formed between the first and the second magnet at least in the operating position of the support.

2. A device as claimed in claim 1, characterized in that in the operating position the radial air gap between the first and the second permanent magnet has an axial length corresponding to the maximum or substantially maximum value of the resulting magnetic force in the magnetic force/axial length diagram of the magnet system.

3. A device as claimed in claim 1, characterized in that the second permanent magnet is cylindrical.

4. A device as claimed in claim 1, characterized in that at its side which faces the turntable the disc-pressure means has a conical wall portion which is movable through an opening in the support, which wall portion as the support moves towards its operating position cooperates with a peripheral portion of the support which bounds said opening, to pre-centre the disc-pressure means relative to the turntable, and which is spaced from said peripheral portion in the operating position of the support.

5. A device as in claim 1, wherein the first and second magnets are arranged so that the length of radial air gap increases and so that the repelling force between said magnets increases as the support is moved from the rest position to the operative position.

* * * * *